United States Patent [19]
McGinnis

[11] Patent Number: 5,551,476
[45] Date of Patent: Sep. 3, 1996

[54] BALANCED-FLOW GAS SAFETY VALVE

[75] Inventor: Joseph M. McGinnis, West Chester, Pa.

[73] Assignee: UMAC Incorporated, Exton, Pa.

[21] Appl. No.: 369,132

[22] Filed: Jan. 5, 1995

[51] Int. Cl.⁶ .................................................. F16K 17/30
[52] U.S. Cl. ............................................. 137/517; 137/498
[58] Field of Search ..................................... 137/498, 517

[56] References Cited

U.S. PATENT DOCUMENTS

| | | | |
|---|---|---|---|
| 1,764,181 | 6/1930 | Raetz | 137/517 X |
| 2,699,799 | 1/1955 | Wager | 137/517 X |
| 3,438,389 | 4/1969 | Lupin . | |
| 3,675,487 | 7/1972 | Mueller | 137/517 X |
| 3,918,481 | 11/1975 | Doe et al. | 137/517 X |
| 4,874,066 | 10/1989 | Silberstein | 137/517 X |
| 4,958,657 | 9/1990 | Hagan et al. . | |
| 5,293,898 | 3/1994 | Masloff | 137/517 |

OTHER PUBLICATIONS

Dresser Manufacturing Division, *Dresser Style 488–XSF Excess Flow Device*, Form No. XSF–1090.

Primary Examiner—Stephen M. Hepperle
Attorney, Agent, or Firm—Browdy and Neimark

[57] ABSTRACT

A gas line limiter valve is preferably built into a stiffener used to connect gas lines. The valve includes a through-passage having a large bore and a small bore downstream from the large bore, with a conical valve seat between. A central reservoir may be disposed between the large and small bores. A movable float includes a piston disposed within the large bore, a stem disposed within the small bore, and a popper to seal against the valve seat when the float is moved downstream. A coil spring urges the float upstream. The stem and the piston are cylindrical. The piston and large bore form a first orifice, and the stem and small bore form a second orifice. With the second orifice being smaller than the first, the second orifice and the buffer gas inside the reservoir create a resistance to the valve closing during sudden temporary drops in the downstream pressure.

4 Claims, 1 Drawing Sheet

BALANCED-FLOW GAS SAFETY VALVE

FIELD OF THE INVENTION

The present invention relates to pipeline flow safety valves, especially such safety valves that are incorporated into pipe couplings.

BACKGROUND OF THE INVENTION

Flow safety valves are used in the natural gas industry to prevent explosive pipeline gases such as natural gas, propane, methane, coal gas, town gas, etc. from escaping when a pipe is ruptured. These safety valves will remain open during normal use, when there is back pressure downstream from the valve, but will trip (snap shut) when the downstream pressure disappears. This prevents fires and explosions when gas lines are ruptured. However, some of these safety valves are not designed to shut off the flow completely when tripped. Instead, a small controlled leakage flow is allowed through such a valve to re-pressurized the line after the break is repaired.

The basic idea of small controlled leakage is presented in U.S. Pat. No. 3,918,481, issued to Doe et al. The Doe patent shows a limiter comprised of a hollow valve body with a movable valve head (or float) 22 inside. At the upstream end, where gas enters the valve, is an insert 12 with a circular edge which acts as a seat for the float 22; flutes 28 create gaps between the float and the insert 12, allowing the float to remain seated during normal gas flows. A coil spring 20 pushes the float against the insert.

When the flow is greater the float is pushed downstream and the force of the coil spring is overcome. At the downstream end of the float is a long stem 24, integral with the float, which is inserted into the smaller open end of a conical insert 14. The stem diameter varies with the distance from the valve body; as the float is pushed downstream by the flow of gas, the stem's cross-sectional area variation affects the flow of gas through an annular space 38 between the stem and an insert 14, but does not introduce appreciable pressure drop. (See the Doe '481 patent at col. 1, line 45; col. 2, lines 40–62; and claim 2.)

Doe does not disclose or suggest the use of a cylindrical stem or one of constant or substantially constant cross-section. Neither does Doe disclose or suggest a substantially cylindrical bore in which a stem might be disposed. The stem of Doe does not aid in assembly; instead, it makes assembly difficult.

U.S. Pat. No. 3,438,389 to E. R. Lupin shows a liquid flow metering device with an elongate cylindrical stem 16 disposed within a cylindrical bore. The stem 16 is not movable. An un-numbered base element of greater diameter supports the stem 16. The base element appears to be concentric with the interior of the movable piston 24 for a short distance. This device is not a valve.

U.S. Pat. No. 2,699,799 to Wager shows a scavenging-air valve for a soot blower having a major cylindrical bore 24 and a smaller portion (bore) 29. A part 28 (FIG. 4) slides within the portion 29 with a clearance of 0.010 inch for alignment (col. 2, lines 50–53). In the bore 24 slides a disc-like collar 32 with a free sliding fit (col. 2, line 57). The collar 32 includes channels 35 which leak steam past the collar 32 (FIG. 5); leakage past elements 28 or 32 is not disclosed. This is not a gas line safety valve.

U.S. Pat. No. to Hagan et al., 4,958,657, dated Sep. 25, 1990 and assigned to UMAC, Inc., shows a gas-line flow restrictor comprising a cylindrical pipe or bore within which a valve head member (float) 24 is free to move. The float 24 has a tapered nose 26 which closes against a circular edge to shut down the gas flow when the valve is tripped; a coil spring holds the float away when the flow is less than the trip value. To limit the upstream travel of the float, an annular step 32 acts as a stop for guiding fins 30 of the sliding valve head 24. The cruciform fins 30 guide the float along the bore and allow gas to pass by. The upstream side of the float is not tapered or streamlined. The body or shell has a uniform outside diameter for placement inside a pipe (col. 3, line 35). The Hagan device differs from that of Doe in having the conical nose pointing in opposite directions: the Hagan devices point downstream, whereas the nose of the Doe device points upstream.

Form No. XFS-1090 published by Dresser Manufacturing Division of Dresser Industries, Inc., Bradford, Pa. 16701, shows a style 488-XFS Excess Flow Device (EFD) that is incorporated into a connector as the insert stiffener. The Dresser 488-XFS device consists of a steel body tube which has an annular step for retaining one end of a coil spring. A float or popper has a downstream conical surface that bears against a valve seat formed into the steel body upstream of the step. A retaining washer is crimped or staked into place at the stiffener end against the upstream end of the float or popper. Another model eliminates the washer, in which case the end of the poppet is retained solely by crimping the end of the casing or stiffener.

Assembly of the device requires that the washer, spring, and popper be installed correctly and held in position during the operation of joining the stiffener to the body of the pipe connector. The 488-XFS device is designed to work with Dresser Style 501 compression ends, which include a flat end with a flange set back from the end. Thus, the crimping or staking is minimal and the Dresser devices have the disadvantage that the parts are not sufficiently securely held within the stiffener.

If the Dresser device needs to be dis-assembled in the field (for example, to remove dirt that has fallen into the device) the user will have great difficulties. First, to undo the crimps will be a matter of substantial difficulty. If the crimps are undone and then remade, the metal of the edge may become fatigued and the device may fail. To re-crimp while holding the washer in place would be extremely difficult if at all possible in the field. The prior art also does not disclose a gas line safety valve built into a stiffener that is easy to assemble, securely held, and easily disassembled.

Another problem which has not been addressed by the prior art is that of sharp, but temporary, drops in the downstream pressure caused by snap-acting loads, i.e. not caused by line ruptures. Such fluctuations may cause the prior-art gas line safety valves to trip, shutting off the gas supply. Once the safety valve is tripped, very little gas can move into the low-pressure region; it will then take appreciable time for the limiter to reset. Meanwhile, the appliances downstream are starved of gas.

The prior art does not disclose a gas flow safety valve for natural gas lines and the like which incorporates a structure for increasing the resistance to these fluctuations.

SUMMARY OF THE INVENTION

Accordingly, the present invention has an object, among others, to overcome deficiencies in the prior art, such as noted above.

Another object is to provide an improved gas line safety valve at a reduced cost, and a further object is to provide such a safety valve which is particularly suitable for low gas flow environments.

The present invention provides a safety valve built into a stiffener, preferably made of steel, which in turn is incorporated into a connector. The outside surface of the stiffener may have various shapes, depending upon the particular variety of tubing or pipe and the connector type. Whatever the outside shape, the internal configuration of the stiffener includes a large bore, a small bore, and a valve seat disposed between the two bores. The valve seat is preferably generally conical. A circumferential groove is inscribed into the large bore distal the valve seat, into which a snap ring is inserted to act as an internal shoulder and prevent the float and spring from falling out.

Removably disposed within the large bore are a float and a coil spring. The float is freely slidable within the large bore, and is urged upstream by the coil spring. The float includes guide fins at its upstream end, which hold the float in alignment within the large bore while permitting gas to flow past it. Just downstream from the fins is a circular large orifice piston. Past the large piston is a poppet which seals against the valve seat of the stiffener. At the downstream end of the float is a long cylindrical stem. The stem is disposed within the small bore; the stem and the small bore together constitute a small orifice.

Gas flowing in the line must pass first through the large orifice, between the piston of the float and the large bore, and second through the small orifice, between the stem and the small bore. The gas undergoes a pressure drop in both constrictions. The areas of the orifices and the pistons can be chosen so that the valve has a delayed response to sudden drops in downstream line pressures, for any chosen steady-state trip pressure.

BRIEF DESCRIPTION OF THE DRAWING

Other objects and the nature and advantages of the present invention will be more apparent from the following detailed description of an embodiment taken in conjunction with the drawing, wherein.

DETAILED DESCRIPTION OF THE PREFERRED EMBODIMENT

Figure 1:
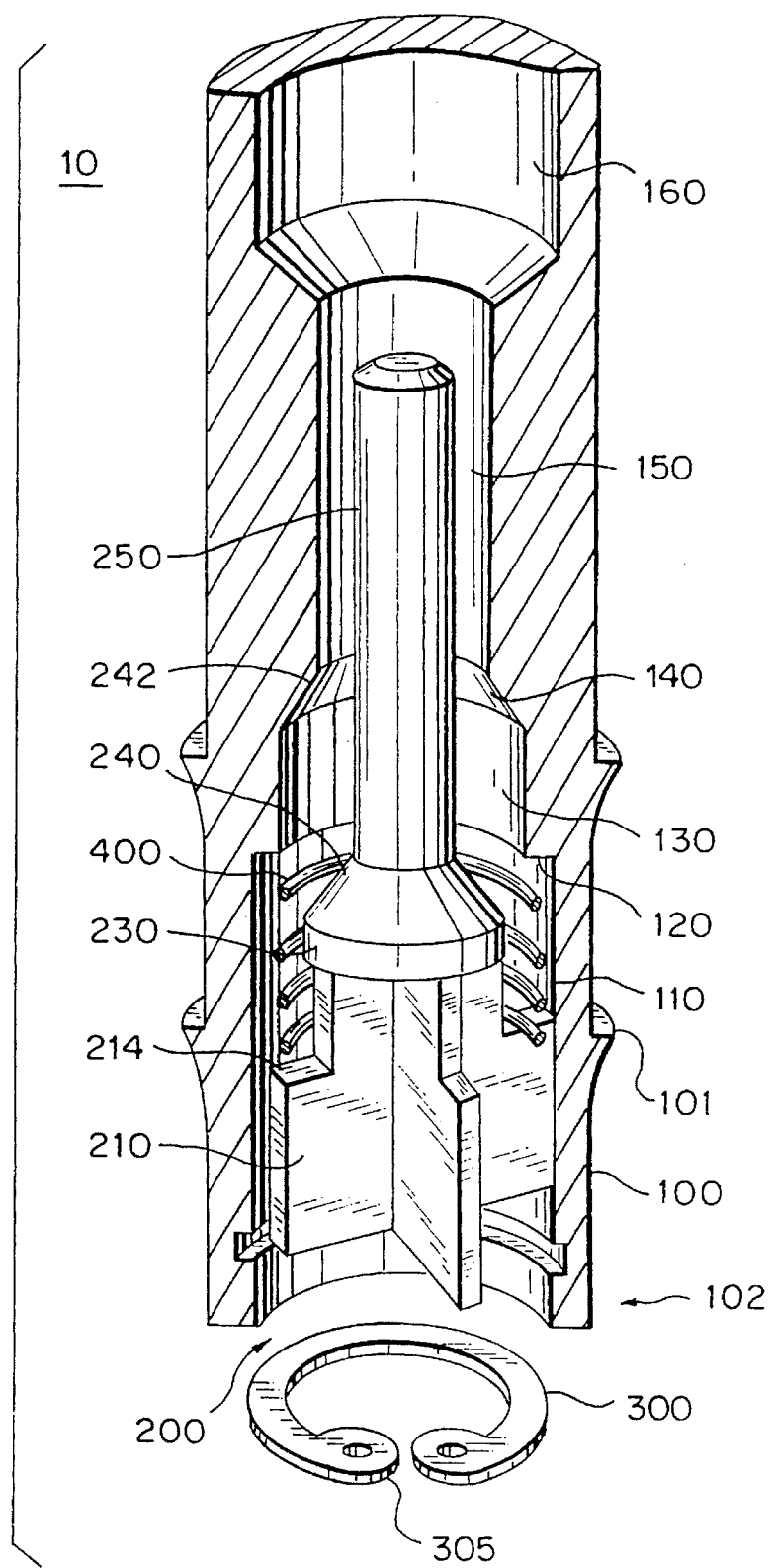
FIG. 1 is a perspective, exploded, partially cross-sectional view of an embodiment of the invention.

The present invention relates to a flow restricting safety valve 10 for gas lines such as natural gas lines. The invention includes two orifices, namely an upstream orifice and a downstream orifice, which delay shutting off the valve of the limiter by delaying the full pressure drop across both valve orifices when the down-stream line pressure quickly drops and then rebounds. The valve closes when downstream pressure drops permanently, as from a pipeline rupture; and, as a result, when the pressure difference across the valve increases to a maximum at the trip value, the valve will close.

An embodiment of the safety valve 10 of the present invention is shown in FIG. 1. A body 100 (shown in cross section; the half facing the viewer is removed) is intended for insertion into a line coupling or joint as a stiffener. (A stiffener is a standard part of many gas line couplings. It is typically a hard plastic or metal sleeve which internally reinforces the joint.) Ribs 101 are exemplary of an adaptation of the body 100 for use as a stiffener, in this example being adapted for use with plastic tubing into which the stiffener body 100 might be inserted. The tubing will be gripped tightly by the ribs 101. Other couplings may employ alternate exterior configurations of the stiffener 100, as a matter of design choice. The present invention is unrelated to exact exterior shape.

The present device may be constructed in any size consistent with its use in a gas line, or as a stiffener in a gas line. Dimensions given below are merely exemplary.

In FIG. 1 the lower end of the stiffener 100 is the inlet and/or the upstream end 102 of a through-passage extending within the limiter valve. A cylindrical large internal bore 110, having a diameter of approximately ⅜ inch, extends a short distance into the body of the stiffener 100. Proximal the inlet 102 is a groove 103 which accepts a snap ring 300, shown exploded out the groove 103 in FIG. 1. The snap ring 300 is a spring ring and includes eyelets 305, which allow a user to contract the snap ring 300 against its normal biased diameter for insertion into the groove 103, after which (upon release) it springs back to its normal size. The snap ring 300 is inserted into the groove 103 to restrain a valve body or float 200, which is shown in FIG. 1 in perspective view, within the stiffener 100.

The large bore 110 terminates in a stop shoulder 120 against which a coil spring 400 rests. Beyond the stop shoulder is an intermediate reservoir 130, having in this embodiment a diameter less than the internal bore 110, and which serves as the first reservoir. Farther downstream is a valve seat 140, which is generally conical in shape. Beyond the valve seat 140 is a small bore 150, of diameter less than the intermediate reservoir 130. Downstream of the small bore is a greater bore or space 160, which has a large diameter, so as to provide low resistance flow of gas, and which serves as a second reservoir.

The valve body or float 200 further comprises upstream fins 210 like those of the aforementioned Hagan USP, which are radially disposed about the central axis of the float 200, a piston portion 230, a poppet portion 240 comprising a conical surface, and the stem 250. The stem 250 is disposed through the greater part of the length of the small bore 150. The four fins 210 each includes a respective step 214 against which the coil spring 400 rests. The coil spring 400 is slightly compressed when the float 200 is inserted into the stiffener 100 and the snap ring 300 is snapped into the groove 103.

The piston 230 and the stem 250 are preferably cylindrical, but may as a design choice be made prismatic (eg., square in cross section). As these parts are preferably molded, this can be done simply. The bores may also be prismatic, but will generally be formed as circular cylinders for ease of manufacture.

When downstream pressure in the space 160 drops so that the pressure differential across the valve increases to a maximum at the valve's respective trip flowrate, then the float 200 will be pushed downstream and the poppet portion 240 will seal against the valve seat 140. For example, the valve may be constructed to close at a flow rate of 400 to 500 SCFH (standard cubic feet per hour) when the pressure differential across the valve reaches 2.0–22.5 psig. If desired, a re-pressurization notch 242, or other equivalent leak means, may optionally be included in the popper portion or elsewhere, e.g. the valve seat 140, for controlled slow leakage after the valve closes.

A first upstream orifice is formed between the piston portion 230 and the large bore 110. The piston portion 230 is circular with a diameter less than the internal bore 110 in the described embodiment. A second downstream orifice of annular shape is formed between the small bore 150 and the stem 250, which has a diameter less than the small bore 150. These two orifices are the major impediments to flow of gas through the valve from upstream to downstream, which in FIG. 1 is a flow from below to above. The upstream and downstream orifices are chosen so that the downstream orifice area is less than the upstream orifice area in the preferred embodiment.

Between the two orifices is an enclosed space, adjacent the reservoir 130. This gas reservoir affects the functioning of the present invention. If a sudden but temporary depressurization occurs downstream in the space 160, there will be no immediate pressure drop on the upstream side of the piston 230 because of the resistance to gas flow through the second orifice; thus, the reservoir 130 acts as a buffer. However, if the depressurization downstream continues for a longer time, then sufficient gas will leak from the reservoir 130 through the second, annular orifice to cause a lower pressure on the downstream side of the piston 230. This will cause increased gas flow over the piston 230 and lead to tripping of the valve.

As the piston 230 is moved in a downstream direction, that is, upward in FIG. 1, gas trapped within the reservoir 130 is pressurized by the motion of the piston 230 and exerts a greater downward or upstream force on the piston 230, increasing the valve's resistance to closing (tripping) from sudden, temporary drops in downstream pressure caused by snap-acting loads, pressure surges, etc.

The invention contemplates buffer spaces formed otherwise than as a mere space between bores.

In terms of moving the float, the piston in the large bore is more responsive to pressure because the large cross-sectional piston area is greater than the cross sectional area of the stem. This is because the area of a piston (which is the quantity that responds to pressure) varies with the square of the diameter. Two pistons, having different diameters but surrounded by the same annular orifice area, will both restrict gas flow the same but the larger will be pushed more by any pressure difference due to its respective orifice restriction. For example: a 1.00 inch diameter piston in a 1.10 inch bore and a 1.41 inch piston in a 1.49 inch bore both have the same orifice area, about 0.2 square inches; but in the same gas line, the larger piston will be subjected to roughly twice the force.

By properly choosing the cross-sectional area of the first orifice, the cross-sectional area of the second orifice, the volume of the reservoir 130, and the spring constant of the coil spring 400, it is possible to construct the valve to have a particular desired resistance to closing (tripping) from certain pressure fluctuations.

The present invention is unlike the device of Doe in that the flow resistance of the downstream orifice is generally constant regardless of longitudinal displacements of the float 200. In the Doe device, motions of the float cause variation in flow resistance because of the tapering of Doe's stem. In the present invention, the stem is inserted most of the way through the small bore 150 and its further insertion makes no change to the flow resistance of the second orifice.

The stem 250 acts not only to form the second annular orifice within the small bore 150, but also to aid with inserting the float 200 into the stiffener 100. Due to the narrow gap between the small bore 150 and the stem 250, it is possible (though no more likely than in prior-art devices) that dirt may jam the mechanism. In such a case, it is desirable to be able to disassemble the safety valve of the present invention. Disassembly can be accomplished by removing the snap ring 300, the float 200 and the coil spring 400. After removing any dirt within the small bore 150, the stiffener valve may be reassembled by inserting the stem 250 into the end of the stiffener body 100. The long-pointed stem is an aid in inserting the float 200 because of the valve seat 140, which guides the stem 250 into the small bore 150. This is unlike the prior art device of Doe, which is very difficult to assemble in this manner due to the very small aperture at the end of the member 14, which aperture must be accurately hit by Doe's stem when assembling.

The foregoing description of the specific embodiments will so fully reveal the general nature of the invention that others can, by applying current knowledge, readily modify and/or adapt for various applications such specific embodiments, without departing from the generic concepts, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A gas flow safety valve comprising:

a through-passage including an upstream large bore, a downstream small bore, and a valve seat disposed between the large bore and the small bore;

a float slidably disposed within the through-passage, the float including a piston disposed within the large bore, a stem disposed within the small bore, and a poppet disposed between the piston and the stem the poppet being sealingly matable with the valve seat, the stem having a lesser cross-sectional area and the piston having a greater cross-sectional area; and spring means for urging the poppet upstream and away from the valve seat;

whereby an upstream orifice is formed between the large bore and the piston, a downstream orifice is formed between the small bore and a stem, and gas flowing Sequentially through the upstream orifice and the downstream orifice may exert fluid forces, opposing the spring means, to close the poppet against the valve seat; and wherein the large bore, the small bore, the piston, and the stem are each cylindrical in shape and are all mutually concentric; and wherein the valve seat and the poppet are generally conical and an apex of a surface of the poppet is disposed downstream of the poppet; and wherein the float includes guide fins slidably engaging the large bore for aligning the float within the through-passage.

2. The gas flow safety valve according to claim 1, wherein the spring means includes a coil spring, the through-passage includes a stop shoulder intermediate the large bore and the small bore, and the fins include respective steps, such that the coil spring may be disposed within the large bore and bear against the steps and the stop shoulder to urge the poppet upstream and away from the valve seat.

3. In a combustible gas supply line for passing a continuous or intermittent supply of natural or other consumer gas from a source thereof to a combustible-gas user, comprising a gas supply pipe having opposite ends and a safety flow valve spaced along said pipe within a stiffener, the improvement wherein:

said stiffener has an internal wall surface defining an internal passageway extending axially therethrough, an annular valve-seat along said passageway, a large bore upstream from said valve-seat and a small bore downstream from said valve-seat, a first reservoir between said valve-seat and said large bore, and a second reservoir downstream from said small bore;

a valve body positioned within said passageway and capable of axial movement between said valve-seat and an upstream position, and said valve body having an annular surface for mating with said annular valve-seat, a piston portion extending upstream from said annular surface, guiding fin means upstream from said piston portion for radially centering said valve body within said passageway, and a cylindrical stem extending downstream from said annual surface and extending into said small bore; and a coil spring for biasing said valve head toward said upstream position and away from said valve seat.

4. The device according to claim 3, wherein the large bore includes a circumferential groove, and wherein the stiffener further comprises a removable snap ring disposed within the groove, the ring extending inwardly when so disposed, such that the valve body is prevented from moving out of the large bore past the groove.

\* \* \* \* \*